Dec. 24, 1963  D. T. AYERS, JR  3,115,067
POWER BRAKE FOR MOTOR VEHICLES
Filed Sept. 11, 1961
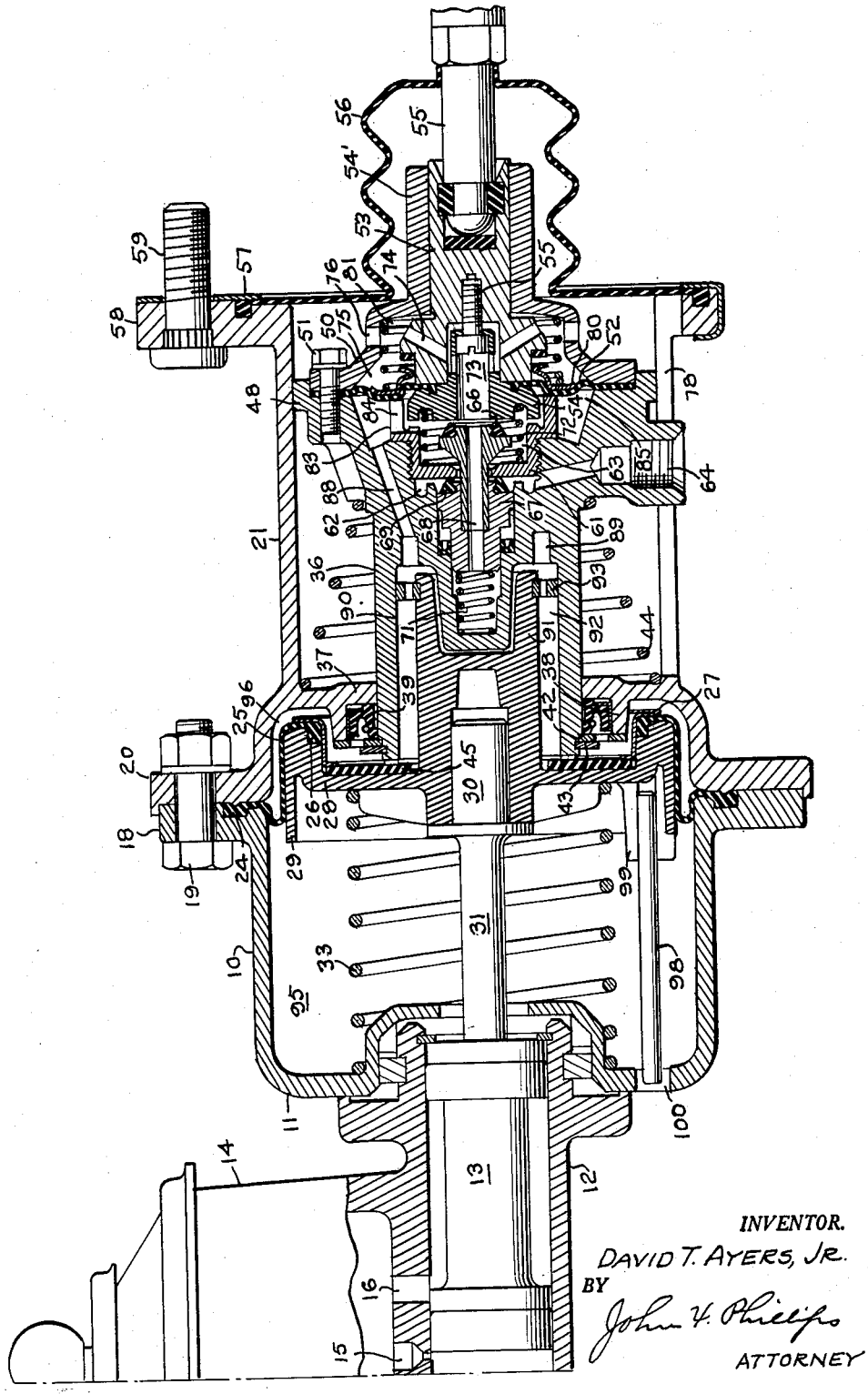
INVENTOR.
DAVID T. AYERS, JR.
BY
John V. Phillips
ATTORNEY

United States Patent Office 3,115,067
Patented Dec. 24, 1963

3,115,067
POWER BRAKE FOR MOTOR VEHICLES
David T. Ayers, Jr., Birmingham, Mich., assignor to Kelsey-Hayes Company, Romulus, Mich., a corporation of Delaware
Filed Sept. 11, 1961, Ser. No. 137,397
12 Claims. (Cl. 91—391)

This invention relates to a power brake for motor vehicles.

It is now conventional in power operated motor vehicle brake systems to provide a booster motor for generating hydraulic brake-applying pressures and to control such motor by pedal operable means which operates the follow-up valve mechanism and also assists the motor in generating hydraulic pressures. Such a mechanism therefore is of the well known booster type and has been highly successful in operation. In a booster type mechanism, the brake pedal partakes of substantial travel since it follows through with respect to the booster motor piston to assist the latter in applying the brakes.

An important object of the present invention is to provide a mechanism wherein the brake pedal normally partakes of limited travel solely to operate the valve mechanism thus making it unnecessary for the operator to substantially depress the brake pedal, all of the braking pressures normally being generated by the motor.

A further object is to provide a mechanism of this character wherein, upon a failure in power for the brake-applying motor, the pedal operable means may be moved through a full stroke to operate the brakes by pedal pressure, and wherein, in the event of a so-called "panic stop" the operator may follow the instinctive way of operating the brake pedal by depressing the pedal through its full stroke to assist the motor in applying the brakes.

A further object is to provide a motor mechanism of this type wherein valve elements of the motor are pedal-operated and wherein the valve housing carrying the seats for the valve elements is not fixed to the motor piston as is customary in booster brake mechanisms but remains stationary during normal brake operations and wherein such normally stationary valve housing is movable by pedal pressure to follow up with respect to the motor piston and apply solely pedal-generated forces to the master cylinder piston or to apply such forces to boost the motor pressure in operating the brakes.

A further object is to provide in a mechanism of this character reaction means which opposes brake pedal operation in proportion to the degree of brake application even though no direct pedal forces are being applied to the master cylinder piston.

Other objects and advantages of the invention will become apparent during the course of the following description.

In the drawing the FIGURE is a fragmentary axial sectional view through the motor mechanism showing a portion of the master cylinder and a portion of the pedal operable rod for operating the valve mechanism.

Referring to the drawing, the numeral 10 designates a motor cylinder having a head 11 at one end, to which is secured in any suitable manner a conventional master cylinder 12. The master cylinder has the usual plunger 13 therein, and a supply of hydraulic brake fluid is maintained in a reservoir 14 and is supplied to the master cylinder through the usual ports 15 and 16.

The cylinder 10 is flanged as at 18 to be bolted as at 19 to a flange 20 formed on a casing 21 of generally cylindrical form coaxial with the cylinder 10 and extending therefrom in the direction opposite the master cylinder. The bolts 19 serve to clamp between the flanges 18 and 20 a bead 24 at the outer periphery of a rolling diaphragm 25, the inner periphery of which is beaded as at 26 and secured by a retainer 27 to a preferably cast motor piston body 28 having a peripheral flange 29 over which the diaphragm 25 is adapted to roll. The piston body 28 has a hub portion to be referred to, in one end of which is arranged a pilot stud 30 formed on a push rod 31, the forward or left-hand end of which is engaged in any suitable manner with the master cylinder plunger 13 to transmit movement thereto. The piston body 28 is biased to its normal off position shown by a return spring 33, and movement of the piston body 28 to off position is limited in a manner to be described.

A valve housing 36 is mounted within the casing 21. The left-hand end of such valve housing is cylindrical and slides through a bearing wall 37 formed integral with the casing 31. An annular flange 38, carried by the bearing 37, surrounds and houses a seal 39 to prevent leakage around the cylindrical portion of the housing 36.

A perforated plate 42 normally engages the end of the flange 38 and is retained in position by a snap ring 43. The valve housing 36 is biased toward the right in the drawing by a spring 44 and its movement is limited by engagement of the plate 42 with the flange 38. The left-hand end of the housing 36 engages a rubber bumper 45 carried by the piston body 28, and such engagement limits movement of the piston body 28 to its off position shown.

Adjacent its right-hand or rear end, the valve housing 36 is provided with an annular flange 48 slidable in the valve housing 21. The flange 48 acts in the nature of a piston slidable in the housing 21, as will be obvious. The flange 48 thus guides the rear end of the valve housing 36 for axial movement, while the forward end of such housing is guided by the bearing 37.

A cap member 50 is fixed as at 51 to the right-hand end of the valve housing 36 and clamps thereagainst a reaction diaphragm 52. The inner periphery of this diaphragm is clamped between an axially movable body 53 and a head 54 fixed thereto by a screw 55, and the body 53 is axially slidable in a concentric extension 54' integral with the cap 50. A push rod 55 is connected at one end to the axial member 53 and has its other end connected to a conventional brake pedal (not shown) preferably of the depending type. The extension 54' is surrounded by a rubber or similar boot 56 secured at one end to the push rod 55 and fixed at its other end by a retainer 57 to a flange 58 formed on the valve housing 21. This flange is adapted to be secured by bolts 59 to the fire wall (not shown) of the motor vehicle.

A plug 61 is threaded in the valve housing 36 and forms at opposite sides thereof chambers 62 and 63, the former of which is in fixed communication with a port 64 connected to a source of suitable pressure, in this case preferably superatmospheric pressure.

The head 54 has its left-hand face adapted to serve as a seat engageable with a rubber or similar exhaust valve 66 carried by a two-part valve body 67 axially bored as at 68. The valve body 67 carries a rubber or similar pressure inlet valve 69 normally engaging the adjacent wall of the plug 61 to close communication between the chambers 62 and 63 around the adjacent stem of the valve body 67. The valves 66 and 69 are biased to their normal positions shown by a spring 71. A spring 72 is arranged between the plug 61 and head 54 to bias the latter to its off position shown, and it will be noted that the valve 66 is normally open to connect the chamber 63 with a bore 73 in the head 54, which bore communicates through passages 74 with a chamber 75 within the cap 50. This chamber, in turn, communicates as at 76 with the interior of the casing 21, and this casing is open to the atmosphere at the bottom through a longitudinal slot 78 through which slides the portion of the housing 36 in which the port 64 is formed.

A sheet metal backing plate 80 engages the right-hand side of the diaphragm 52 and a spring 81 biases to the left that portion of the diaphragm 52 engaged by the backing plate referred to. The opposite side of the diaphragm 52 is limited by engagement with the outer flange 83 of the plug 61, which flange is cut away as at 84 to afford communication between the chamber 63 and a chamber 85 formed in the valve housing 36.

A passage 88 in the valve housing 36 communicates at one end with the chamber 85 and at its opposite end with an annular groove 89 formed in the valve housing 36 at the inner end of a bore 90. The hub of the piston body 28 is formed as an inwardly extending axial portion 91 spaced from the bore 90 to form an annular chamber 92 to which pressure is supplied from the passage 88 in a manner to be described, upon operation of the valve mechanism. A perforated bearing 93 is carried by the extension 91 and is slidable in the bore 90 to guide the motor piston relative to the valve housing 36.

The piston body 28 and diaphragm 25 divide the motor cylinder 10 to provide an atmospheric chamber 95 and a working chamber 96 open to the chamber 92. Obviously, when pressure is supplied to the chamber 92, such pressure builds up in the working chamber 96 of the motor to move its piston to the left to operate the master cylinder piston 13.

A stroke indicating rod 98 is fixed at one end to the piston body 28 by being driven into a split integral sleeve portion 99 carried thereby. The motor chamber 95 communicates with the atmosphere through an opening 100, and the rod 98 projects through such opening to be visible when the motor is operated.

*Operation*

As stated above, the parts are shown in their normal positions in the figure, the valve 66 being opened and the valve 69 closed. Therefore, the chamber 63 is closed to the pressure source connected to the port 64. The motor chamber 96 is always in communication with the chamber 63, as pointed out above, and with the valve 66 open, the chamber 63 will communicate with the atmosphere through the bore 73, ports 74 and the interior of the casing 21. Obviously this casing is always open to the atmosphere through the slot 78.

When the brake is to be operated, the pedal will be slightly depressed to move the rod 55 to the left to engage the head 54 with the valve 66 to close the chamber 63 to the bore 73. Very slight additional movement will crack the valve 69, thus admitting pressure through the port 64 and chamber 62 to the chamber 63, thence through passages 88 and 92 to the motor chamber 96. The motor piston will then move to the left to transmit movement to the master cylinder piston 13 to displace fluid into the conventional wheel cylinders (not shown). It will be apparent that while the valve housing 36 is slidable in the bearing 37, it is biased to its normal position shown by the spring 44. Operation of the valves 66 and 69 in the manner stated, therefore, does not effect any movement under normal operating conditions of the valve housing 36, this unit remaining in the position shown while the motor piston moves to the left.

Initial operation of the valve mechanism takes place with the motor piston moving against only slight resistance up to the point of initial engagement of the brake shoes with the drums. In other words, the motor chamber 96 expands relatively rapidly, and there will be no initial substantial building up of pressure in the chamber 63. What pressure is present, however, acts against the left-hand face of the head 54 outwardly of the valve 66 to slightly resist movement of the push rod 55 and hence of the brake pedal, thus providing an initial stage of pedal reaction which will be proportional to pressure in the motor chamber 96. This pressure, of course, will be proportional to hydraulic pressure generated by the master cylinder plunger 13.

As soon as the brake shoes engage the drums, there will be substantial resistance to movement of the plunger 13 and consequently of the motor piston 28, and for a given degree of opening of the valve 69, there will be a rapid rise in pressure in the chamber 96 which results in the transmission of substantially greater force from the piston 28 to the plunger 13 to develop the necessary hydraulic braking pressures. Such increased pressure in the motor chamber 96 is reflected in the chambers 63 and 85. During the initial stage of brake operation the diaphragm 52 will be seated against the adjacent end of the plug 61, being retained in such position by the spring 81. When pressure substantially increases in the chambers 63 and 85 incident to engagement of the brake shoes with the drums, the spring 81 will be caused to yield and pressure to the left of the diaphragm 52 moves this diaphragm to the right to take up the play between the plate 80 and the axially movable member 53. This provides a second stage of brake pedal reaction wherein pressures effecting both the diaphragm 52 and head 54 will be transmitted to the brake pedal. While this reaction pressure is proportionately higher than in the initial stage of reaction, it is nonetheless proportional to pressure in the motor chamber 96 and through the "feel" of the pedal, therefore, the operator is apprised as to the degree of brake application. The operator of course also feels the rate of vehicle deceleration and when he has caused braking pressures to increase to the desired point, he will permit the brake reaction pressures to back off the pedal sufficiently to close the valve 69 to place the valve in lap position unless and until it is desired to increase or decrease the braking pressure.

If by any chance the supply of pressure through the port 64 should fail, the brake may be manually applied. The pedal will be depressed and slightly beyond the point at which the valve 66 will close and the valve 69 open, the head 54 will engage the plug 60 and manual force applied to the brake pedal will move the valve housing 36 and the end of the cylindrical portion 29 thereof, engaging the bumper pad 45, will effect movement of the motor piston and hence of the master cylinder plunger 13 for the manual operation of the brakes.

In the normal operation of the mechanism the valve housing 36 remains stationary, as stated. The capacity of the motor is such that within the limits of its power, maximum brake application can be provided without any boosting effort on the part of the operator. This not only relieves the operator of the physical effort of assisting the motor in applying the brakes but also normally makes it necessary for the operator to move the brake pedal only a fraction of an inch for the operation of the valves 66 and 69 to energize the motor to apply the brakes to whatever extent is necessary. If, in making a so-called "panic" stop, the operator pushes the pedal beyond the point necessary for the operation of the valves 66 and 69, the valve housing will be moved by pedal forces in the same manner as described above if the power should fail. If the operator pushes the pedal to its limit of movement, the valve housing 36 will engage the motor piston to assist the motor in applying the brakes.

The operation of the parts when the brake pedal is released will be the reverse of the operation described above. The releasing of the brake pedal results in movement of the head 54 and associated parts back to the normal positions shown, and the spring 71 will close the valve 69 while the valve 66 will open. Pressure from the source will be cut off to the chamber 63 and the latter will be opened to the atmosphere as described above to vent the motor chamber 96. Assuming that the valve housing 36 has not been moved, it will remain stationary in its normal position, and the spring 33 of the motor will return the piston 28 to its normal off position.

The stroke indicating rod 98 is adapted to provide visual means subject to examination from time to time to make sure that the master cylinder is functioning properly to apply the brakes. When the rod 98 moves too far, it is an indication of the necessity for brake adjustment. Alternatively, the operator from time to time may push the brake pedal manually as far as possible to determine the brake pedal's clearance relative to the toe board to determine when brake adjustment is necessary.

From the foregoing it will be apparent that the present construction provides for the power operation, normally without boosting by the brake pedal, for applying the brakes of a motor vehicle. Contrary to conventional practice, the seats associated with the pressure inlet and exhaust valves do not move, and therefore very slight pedal travel is necessary for any application of the vehicle brakes up to a full application, and through the reaction means described above, the operator is always apprised as to the degree of brake application. Not only is brake pedal travel reduced to a minimum for a full application of the brakes, but in addition very little force is required for applying the brakes since none of the work required for the generation of hydraulic braking pressures is normally performed by the operator. On the other hand, the present mechanism functions to provide for the manual application of the brakes in the event of a failure in the source of pressure for operating the fluid pressure motor.

Where reference is made in the claims to "valve elements," such expression generally includes the valves 66 and 69 per se and the valve seats 54 and 61. It also will be noted that the motor controlling and manual force transmitting portions of the mechanism comprise two units, one of such units comprising the elements 53 and 54, and the other unit comprising the elements 36, 50 and 61. In certain of the claims, these two units have been defined as such.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A motor mechanism comprising a fluid pressure motor having a pressure responsive member provided with a pressure chamber at one side thereof, a valve mechanism comprising a plurality of valve elements, a pair of co-axial units, manually operable means connected to one of said units for moving it to operate said valve mechanism to connect said pressure chamber to a source of pressure, said other unit being axially movable and being normally stationary in abutting engagement with said pressure responsive member when the latter is in off position and free therefrom so that said pressure responsive member is movable independently of said other unit, said other unit being biased to its normal position whereby movement of said one unit relative to said other unit operates said valve mechanism to connect said pressure chamber to said source without effecting movement of said other unit, said other unit being engageable and movable by said one unit under predetermined conditions upon movement of said manually operable means to transmit forces through said other unit to said pressure responsive member.

2. A motor mechanism comprising a motor provided with a pressure responsive member having a pressure chamber at one side thereof, a valve mechanism comprising valves manually movable from normal off positions, an axially movable normally stationary unit associated with said valves and having a normal position, manually operable means for moving said valves to connect said pressure chamber to a source of pressure, said unit being axially movable and having abutting relationship with said pressure responsive member when the latter is in a normal off position whereby said unit is adapted to remain stationary upon operation of said valves while said pressure responsive member is movable away from said valve seat means when pressure is present in said pressure chamber, and means biasing said unit to said normal off position independently of said pressure responsive member, said manually operable means being engageable with said unit to transmit movement thereto to effect manual movement of said pressure responsive member after said valves have moved beyond the position in which said pressure chamber is connected to said source.

3. A motor mechanism according to claim 2 wherein said valve mechanism has an internal chamber between said source and said pressure chamber in open communication with said pressure chamber and to which pressure is admitted upon operation of said valves, an element forming a part of said manually operable means having a pressure face subject to pressure in said internal chamber to oppose movement of said manually operable means in accordance with pressure in such chamber, and pressure responsive means subject to pressure in said internal chamber and operative when such pressure increases above a predetermined point for additionally opposing movement of said manually operable means.

4. A motor mechanism according to claim 1 provided with a manually operable member connected to transmit movement to said valve means, and means within said valve mechanism subject to pressures supplied to said pressure chamber for opposing movement of said manually operable member.

5. A motor mechanism comprising a casing provided with a pressure responsive unit having at one side thereof a pressure chamber, a valve housing supported for movement coaxially with said pressure responsive unit and having abutting relation therewith whereby said pressure responsive unit is movable by pressure in said pressure chamber independently of said valve housing, said valve housing having manually movable valve seat means, valve means coaxial with said valve seat means movable from a normal off position for connecting said pressure chamber to a source of pressure for operating said pressure responsive unit, and means biasing said valve housing to a normal off position whereby manual operation of said valve means connects said pressure chamber to said source without moving said valve housing, said valve means having limited movement relative to said valve seat means whereby movement of said valve means beyond the point at which said pressure chamber is connected to said source transmits manual movement to said valve housing and thence to said pressure responsive unit to effect manual operation thereof.

6. A motor mechanism according to claim 5 wherein said valve housing is provided with an internal reaction chamber communicating through said valve housing with said pressure chamber and to which pressure is admitted upon operation of said valve means, a manually operable member connected to operate said valve means, and means for utilizing pressure in said reaction chamber for opposing movement of said manually operable member.

7. A motor mechanism according to claim 5 wherein said valve housing is provided with an internal reaction chamber communicating through said valve housing with said pressure chamber and to which pressure is admitted upon operation of said valve means, a manually operable member connected to operate said valve means, means for utilizing pressure in said reaction chamber for opposing movement of said manually operable member, and pressure responsive means subject to pressure in said reaction chamber above a predetermined point for additionally opposing movement of said manually operable member.

8. A motor mechanism comprising a casing having a pressure responsive unit therein provided at one side thereof with a pressure chamber, a guide housing projecting axially from said casing, a valve housing within said guide housing having portions contacting therewith to be guided for movement coaxially with said pressure responsive unit, a valve seat in said valve housing, a pair of connected valves one of which is a pressure valve normally engaging said seat, the other of said valves being an exhaust valve at the side of said seat opposite said pressure valve, said valve housing having a chamber in which said exhaust valve is arranged communicating with said pressure chamber, a manually operable valve seat movable coaxially with said valves to engage said exhaust valve and transmit movement to said pressure valve to open it and admit pressure to said pressure chamber, said manually operable valve seat having limited movement relative to said valve housing to engage therewith after said pressure valve has opened, to transmit manual force to said valve housing, said valve housing having abutting relationship with said pressure responsive unit to transmit manual forces thereto, and means biasing said valve housing to normal off position and tending to hold said valve housing in such position whereby said valves may be operated to supply pressure to said pressure chamber without transmitting movement to said valve housing unless said manually operable valve seat transmits to said valve housing force sufficient to overcome said biasing means.

9. A motor mechanism according to claim 8 wherein said chamber in which said exhaust valve is arranged is a reaction chamber, said manually operable valve seat having a surface exposed to said reaction chamber whereby pressures therein oppose valve operating movement of such seat.

10. A motor mechanism according to claim 8 wherein said chamber in which said exhaust valve is arranged is a reaction chamber, said manually operable valve seat having a surface exposed to said reaction chamber whereby pressures therein oppose valve operating movement of such seat, and means responsive to pressures in said reaction chamber above a predetermined point for additionally resisting valve operating movement of said manually operable valve seat.

11. A motor mechanism according to claim 8 wherein said guide housing is provided with a bearing, said valve housing having a cylindrical extension slidable in said bearing, said pressure responsive unit having an axial extension projecting into said cylindrical extension of said valve housing, and bearing means between said axial extension and said cylindrical extension for guiding said pressure responsive unit relative to said valve housing.

12. A motor mechanism comprising a casing, a piston body in said casing, a rolling diaphragm connected to said piston body and to said casing and having at one side thereof a pressure chamber, a member to be operated connected to one side of said piston body and guided for axial movement, a guide housing fixed to said motor casing and projecting therefrom, a valve housing in said guide housing having a portion engageable therewith to assist in guiding said valve housing for movement coaxial with said piston body, said valve housing having a cylindrical extension projecting into normal abutting relationship with said piston body, a bearing carried by said guide housing and in which said cylindrical extension is axially slidable, said cylindrical extension being at the side of said piston body opposite said member to be operated, an axial extension carried by said piston body and projecting into said cylindrical extension, means connected between said axial extension and said cylindrical extension for guiding the former relative to the latter, a valve seat carried by said valve body and dividing the latter to form an inlet chamber and a reaction chamber, the latter of which communicates with said pressure chamber through the space between said axial extension and said cylindrical extension, a pair of connected valves one of which is an exhaust valve and the other of which is a pressure valve in said inlet chamber normally engaging said seat, said inlet chamber being connected to a source of pressure, manually operable means including an exhaust valve seat normally disengaged from and engageable with said exhaust valve to close communication between said reaction chamber and the atmosphere and to unseat said pressure valve, and means biasing said valve housing to a normal off position whereby said exhaust valve seat will engage said exhaust valve to open said pressure valve without transmitting movement to said valve housing, said manually operable means having lost motion connection with said valve housing whereby movement of said exhaust valve seat beyond the point at which it opens said pressure valve will transmit axial movement to said valve housing to effect manual movement of said piston.

References Cited in the file of this patent
UNITED STATES PATENTS

| | | |
|---|---|---|
| 2,745,383 | Hupp | May 15, 1956 |
| 2,934,042 | Stelzer | Apr. 26, 1960 |
| 2,953,120 | Ayers | Sept. 20, 1960 |